(12) United States Patent
Chung et al.

(10) Patent No.: US 8,376,603 B2
(45) Date of Patent: Feb. 19, 2013

(54) MULTI-SEGMENTED LIGHT GUIDE FOR AN INPUT DEVICE

(75) Inventors: Muh Fong Chung, Penang (MY); Choon Guan Ko, Penang (MY); Sian Tatt Lee, Selangor (MY); Fook Chuin Ng, Penang (MY)

(73) Assignee: Intellectual Discovery, Ltd., Seoul (KR)

( * ) Notice: Subject to any disclaimer, the term of this patent is extended or adjusted under 35 U.S.C. 154(b) by 327 days.

(21) Appl. No.: 12/976,790

(22) Filed: Dec. 22, 2010

(65) Prior Publication Data

US 2012/0163028 A1 Jun. 28, 2012

(51) Int. Cl.
*F21V 8/00* (2006.01)

(52) U.S. Cl. ........ 362/613; 362/612; 362/615; 362/616; 362/622; 362/23.03; 200/314

(58) Field of Classification Search .............. 362/23, 362/612, 613, 615, 616, 619, 622, 623, 624, 362/627

See application file for complete search history.

(56) References Cited

U.S. PATENT DOCUMENTS

| 8,317,384 B2 * | 11/2012 | Chung et al. ............ 362/607 |
| 2007/0188677 A1 | 8/2007 | Souk et al. |
| 2007/0247871 A1 | 10/2007 | Yoo |
| 2008/0084512 A1 | 4/2008 | Brott et al. |
| 2008/0297695 A1 | 12/2008 | Sekiguchi et al. |
| 2010/0007819 A1 | 1/2010 | Kumasaka et al. |
| 2011/0079497 A1 * | 4/2011 | Ng et al. .............. 200/314 |

* cited by examiner

*Primary Examiner* — Stephen F Husar
*Assistant Examiner* — James Cranson, Jr.
(74) *Attorney, Agent, or Firm* — Fox Rothschild, LLP

(57) ABSTRACT

An input device and display apparatus with multi-light segments has been disclosed. The input device may comprise a rigid light guide layer having alignment structures that define the rigid light guide layer into multiple light segments, a plurality of first layer flexible light guide films and a plurality of second layer flexible light guide films. The alignment structures may be formed together when making the rigid light guide layer in an injection molding process. By coupling multiple light sources into each of the light guides, the display may be configured to display multiple color and multiple symbols, independently. In another embodiment, the light guide may be utilized in a display apparatus without a LCD.

20 Claims, 8 Drawing Sheets

MULTI-SEGMENTED LIGHT GUIDE FOR AN INPUT DEVICE

BACKGROUND

Hand held electronic devices such as mobile telephones, cordless telephone handsets, hand-held computers, calculators, remote controls, portable game consoles, and the like, often employ keypads for entry of information and commands. Most modern high end smart phones are shipped with touch screens, utilizing the Liquid Crystal Displays (referred to hereinafter as "LCDs") to display any combination of keys, in any shape, in any color and in any brightness. Low cost input devices, due to the cost consideration may not have LCD touch pads as input devices. However, most of the hand held electronic devices in the market today, including low end or low cost products, may no longer be confined to the conventional four by three grid numeric keypad grids, such as the half QWERTY or full QWERTY keypads. Even at the low end, the freedom and flexibility of having any shape, color, or key combination, similar to LCD touch pads, may become standard in future input devices.

An input device may adopt a capacitive sensing approach. Usually an input device may have a printed circuit board (referred to hereinafter as "PCB") adapted to sense touching or pressing on a key plate member. The key plate member may be a semi-transparent plate backlit by a light guide similar to those from an LCD screen. The light guide may be flexible and thin. By having multiple light guides and multiple light sources coupled to the light guides, the keypad may be illuminated partially and independently by the light sources to display specific colors on specific portions of the key plate member.

Illumination schemes are no longer as simple as "light on" or "light off" across an entire four by three grid numerical keypad. The advance of technology in light guide area enables more flexibility in the designs of many input devices, such as the remote control input pads, security input pads, mobile phones, game consoles and other similar electronic devices. While the advancement in input devices is attractive, the assembling or manufacturing process of input devices is becoming more complicated and more expensive, adding to the expense of many electronic devices themselves. For example, an input device that is divided into ten zones of light segments may require up to ten pieces of light guide to be assembled instead of one. If the shape of a particular light guide is irregular, the assembly process may become even more complicated and expensive.

Yet, market conditions are demanding ever more symbols and characters to be squeezed onto a keypad with more light segments being illuminated independently. Therefore, it may be desirable to have an input device, a keypad, or even a light guide with multiple light segments to enable design flexibility. However, market conditions are continuing to push for simplified assembly processes and less expensive electronic devices.

BRIEF DESCRIPTION OF THE DRAWINGS

Illustrative embodiments are described herein by way of example, not by way of limitation, and reference is made to the following drawings, in which the same or like reference numerals between figures may refer to the same or similar elements.

DETAILED DESCRIPTION

Figure 1:
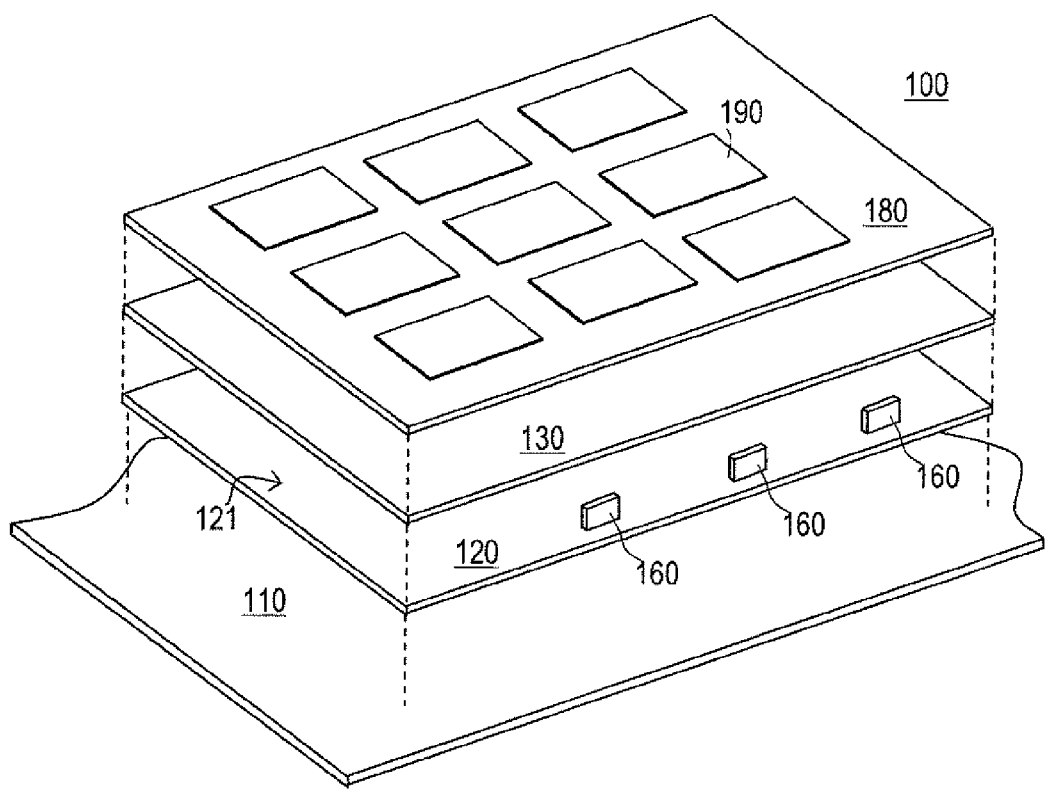
FIG. 1 illustrates an exploded, perspective view of a keypad assembly with a single light guide layer.

FIG. 1 illustrates an exploded, cut-away view of a keypad assembly 100 for an input device having a single light guide layer 130. The keypad assembly 100 may be assembled on a flat portion of the casing or housing 110. The keypad assembly 100 may comprise a substrate 120, such as a printed circuit board (referred to hereinafter as "PCB"), a rigid light guide layer 130, at least one light source 160 located on the substrate 120, and a key plate member 180 having a plurality of keys 190. The substrate 120 may be screwed, riveted, glued or otherwise attached to a flat portion of the casing 110. The rigid light guide layer 130 may be replaced by a flexible light guide film. The light source 160 may be adapted to emit light into the rigid light guide layer 130. In many instances, a reflective sheet or coating 121 may be disposed on the substrate 120. The substrate 120 may comprise several conductive elements (not shown) configured to perform capacitive sensing to detect touching or punching on the key plate member 180 or on the keys 190. The overall thickness of the keypad assembly 100 may typically be less than 1.1 mm. For example, in one embodiment, the key plate member 180 may be approximately 0.35 mm; the reflective coating or sheet 121 may be approximately 0.05 mm; the rigid light guide layer 130 may be approximately 0.3 mm; and the substrate 120 may be approximately 0.2 mm.

The embodiment shown in FIG. 1 may be one of the simplest numeric keypads. Typical keypads commercially available today may be much more complicated in terms of their illumination schemes and designs, compared to the key plate member 180 shown in FIG. 1. For a keypad with a more complex illumination scheme and key arrangement, having multiple light guides and partitioning the light guide into multiple segments may be desirable. Typically, displaying multiple colors at the same time may be quite difficult. However, this may be accomplished by adding more layers of light guides and partitioning the substrate into multiple segments or pieces, as shown in FIG. 2.

Figure 2:
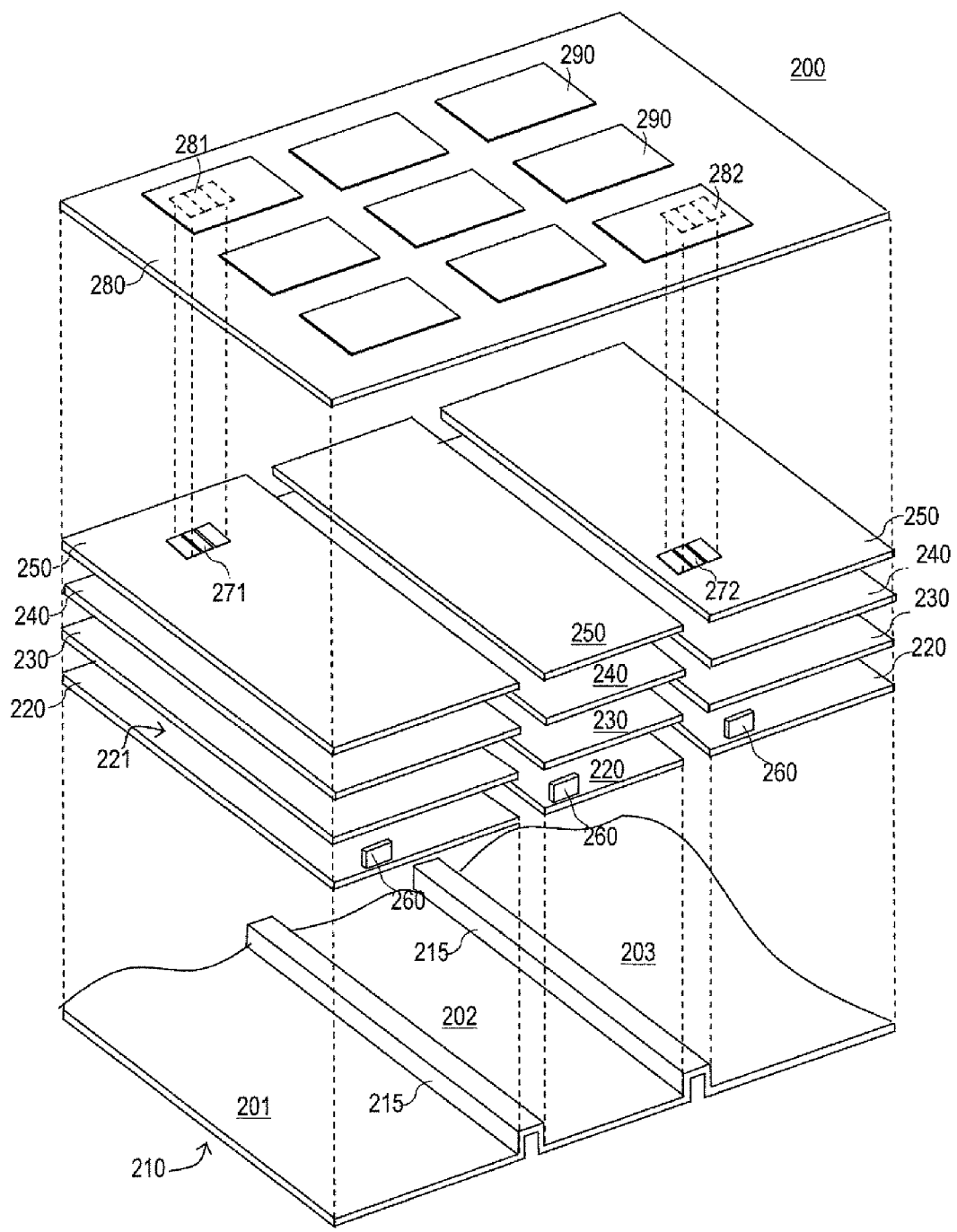
FIG. 2 illustrates an exploded, perspective view of a keypad assembly with multiple PCBs.

FIG. 2 illustrates an exploded, cut-away view of a keypad assembly 200 for an input device having multiple PCBs. Similar to the embodiment shown in FIG. 1, the keypad assembly 200 may be fixed on a flat portion of the casing or housing 210 of the input device. However, one difference compared to the casing 110 shown in FIG. 1 may be that the casing 210 shown in FIG. 2 comprises a plurality of alignment structures or ribs 215 across the flat surface of the casing, adapted to align various portions of the keypad assembly 200. Accordingly, the keypad assembly 200 may comprise a plurality of substrates 220, a plurality of reflective sheets 221, a plurality of rigid light guide layers 230, a plurality of first layer flexible light guide films 240, a plurality of second layer flexible light guide films 250, a plurality of light sources 260, and a key plate member 280 having a plurality of keys 290. The rigid light guide layers 230, the first layer flexible light guide films 240, and the second layer flexible light guide films 250 may be referred to collectively as light guide layers 230-250.

In the embodiment shown in FIG. 2, the alignment structures 215 divide the flat surface of the casing into three rectangular portions with each rectangular portion defining a light segment 201-203 of the keypad assembly. However, more light segments than 201-203, including one or more with an irregular shape may be obtained in a similar manner. Likewise, the substrates 220, the reflective sheets 221, the rigid light guide layers 230, the first layer flexible light guide films 240, and the second layer flexible light guide films 250 may define any regular or irregular shape, as desired. When the number of light segments 201-203 increases, for example, the number of substrates 220 may also increase matching the number of the light segments 201-203, respectively. Accordingly the rigid light guide layers 230, the first layer flexible light guide films 240, and the second layer flexible light guide films 250 may also need to match the number of the light segments 201-203.

Light extractors 271-272 may be formed on the rigid light guide layers 230, the first layer flexible light guide films 240, and the second layer flexible light guide films 250. Light extractors 271-272 may be formed by printing, silk screening, or otherwise depositing a white paint material on the surface of the light guide layers 230-250. Light extractors 271-272 may also be formed by depositing, growing or forming micro-optics structures on the upper surface of the light guide layers 230-250. The light extractors 271-272 may define a shape, a symbol, an alphanumeric character, or the like that a user may see on the key plate member 280. The shape, symbol or alphanumeric character defined by the light extractors 271-272 may be seen when the corresponding light guide layers 230-250 are illuminated. For example, in the embodiment shown in FIG. 2, assuming only the two second layer flexible light guide films 250 carrying the light extractors 271-272 are illuminated, the corresponding areas 281-282 on the key plate member 280 will be illuminated, so that the symbol or alphanumeric character can be seen and all other areas will remain dark.

The light sources 260 may be configured to emit light into one of the rigid light guide layers 230, the first layer flexible light guide films 240 or the second layer flexible light guide films 250. In order to obtain maximum flexibility of the keypad assembly 200, the number of the light sources 260 may match the total number of light guide layers 230-250. For example, in the embodiment shown in FIG. 2, there are three rigid light guide layers 230, three first layer flexible light guide films 240, and three second layer flexible light guide films 250. Thus, the number of light sources 260 may be nine. In one embodiment, the thickness of the substrate 220 may be approximately 0.2 mm; the rigid light guide layer 230 may be approximately 0.3 mm; the first layer flexible light guide film 240 may be approximately 0.2 mm; the second layer flexible light guide film 250 may be approximately 0.2 mm; and the key plate member 280 may be approximately 0.35 mm. However, considering a gap of approximately 0.1 mm between the light guide layers 230-250, the overall thickness may be approximately 1.6 mm.

Figure 3:
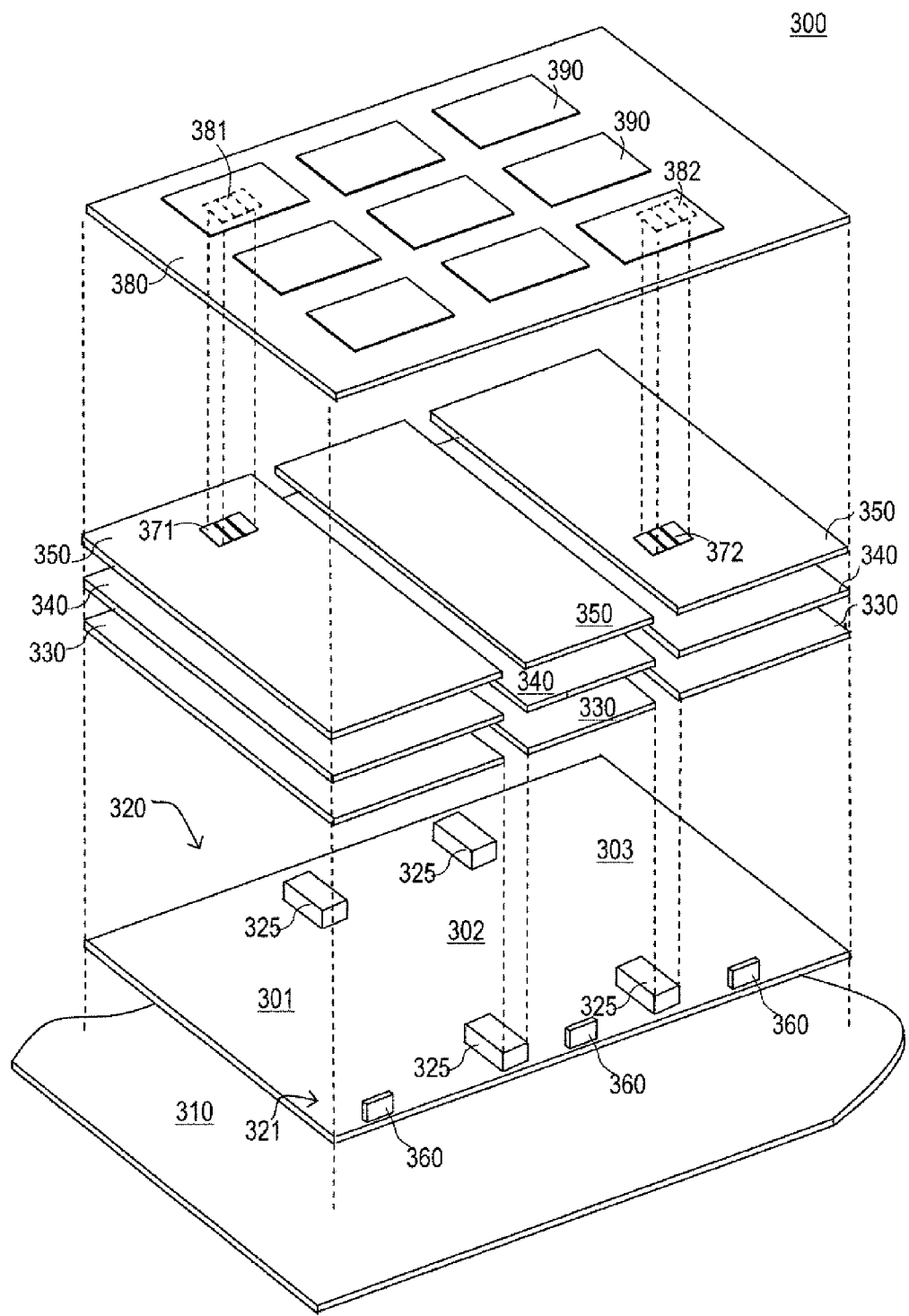
FIG. 3 illustrates an exploded, perspective view of a keypad assembly with a PCB defining multiple light segments.

Having multiple substrates 220, as shown in FIG. 2, may have one disadvantage, because the electrical connections between different substrates 220 may need to be established separately. This may mean additional soldering or additional wiring that may add cost and complexity to the designs. This issue may be overcome with a single substrate, which is illustrated in the embodiment shown in FIG. 3. FIG. 3 illustrates an exploded, cut-away view of a keypad assembly 300 having a PCB defining multiple light segments 301-303.

The keypad assembly 300 may comprise a substrate 320 fixed to a substantially flat portion of a casing, housing or body 310, a reflective sheet 321, a plurality of rigid light guide layers 330, a plurality of first layer flexible light guide films 340, a plurality of second layer flexible light guide films 350, a plurality of light sources 360, and a key plate member 380 having a plurality of keys 390. The keypad assembly 300 may be similar to the keypad assembly 200 shown in FIG. 2 except that the alignment structures 325 are located at the substrate 320 instead of the body 310. However, unlike the alignment structures 215 of FIG. 2, which may be molded, bent or stamped into the body 210, the alignment structures 325 may not be molded, bent or stamped in the substrate 320, because the substrate 320 typically has conductor layers embedded inside (not shown). The substrate 320, such as a PCB, is usually fabricated using various processes that may include etching, printing, photo-resist coating, and etc. The alignment structures 325 may be glued, bolted, screwed, riveted, soldered, or similarly attached to the substrate 320. A gluing or soldering process may not yield the required precision. For example, the tolerance of surface mounting technology may be +/−50 micron and that may be enough to create misalignment of the light guide layers 230-250. The misalignment may become a quality issue, because light extractors 371-372 may be required to align to the corresponding area 381-382 on the key plate member 380.

Using a molding process may be one way to ensure precision of the alignment structures 325 shown in FIG. 3. However, making the alignment structures 325 on the substrate 320 may not be practical. One solution may be making the alignment structures 325 on the rigid light guide layer 330 by means of a molding process. This is shown in the embodiment in FIG. 4, which shows an exploded, cut-away view of a keypad assembly 400 having a rigid light guide layer 430 defining multiple light segments 401-403. The keypad assembly 400 may comprise a substrate 420 attached to a flat portion of the body 410, a reflective sheet or coating 421, a rigid light guide layer 430, a plurality of first layer flexible light guide films 440, a plurality of second layer flexible light guide films 450, a plurality of light sources 460 and a key plate member 480 having a plurality of keys 490. The rigid light guide layer 430, the first layer flexible light guide films 440, the second layer flexible light guide films 450 may be referred to as light guide layers 430-450. Each of the light guide layers 430-450 may have light extractors 470-479, each defining a shape, a symbol, an alphanumeric character, or the like located on the upper surface of the light guide layers 430-450. The light extractors 470-479 may be micro-optics, a white coating or white paint formed or deposited on the upper surface of the light guide layers 430-450.

The light sources 460 may be side view packaged light-emitting diodes (referred herein after as "LEDs"). The LEDs may be mounted and soldered on the PCB, configured to emit light in a direction parallel to the plane of the PCB and into the light guide layers 430-450. The key plate member 480 may be formed of metal, silicon, plastic, polyurethane (referred to hereinafter as "PU"), or any other similar material. The first layer flexible light guide films 440 and the second layer flexible light guide films 450 may be made of any sufficiently transparent, flexible material, such as PU, poly carbonate (referred to hereinafter as "PC"), poly ethylene (referred to hereinafter as "PET"), poly-methyl methacrylate (referred to hereinafter as "PMMA"), or any similar material. The rigid light guide layer 430 may made from PMMA, PC, or any other similar material. The rigid light guide layer 430 may be made from an injection molding or stamping process and the alignment structures 435 may be molded together on the rigid light guide 430 to further define a plurality of light segments 401-403.

The alignment structures 435 may be ribs extending partially or fully across the rigid light guide 430 from one end to the other. The alignment structures 435 may be fabricated together with the rigid light guide 430 in a transfer molding process. The height of the alignment structures 435 may not adversely impact the overall height of the keypad assembly 400. The height may be substantially equal to or slightly less than the overall height of the first and second layer flexible light guide films 440-450. In another embodiment, the alignment structures 435 may define some other irregular shape or shapes. Likewise, the first layer flexible light guide films 440 and the second layer flexible light guide films 450 may define any other irregular shape in accordance to the number of the light segments 401-403 in some other embodiments. The embodiment in FIG. 4 may include three pieces of the first layer flexible light guide films 440 and three pieces of the second layer flexible light guide films 450 in correspondence with the number of the light segments 401-403.

As the alignment structures 435 can be formed in a more precise size and location, stacking up light guide layers 430-450 may not increase placement error. As a result, the number of the flexible light guide films 440-450 may be more than two layers. In yet another embodiment, a third layer of flexible light guide film (not shown) may be stacked on one or all of the second layer flexible light guide films 450. However, additional layers of flexible light guide film may increase the total thickness of the keypad assembly 400. In the embodiment shown in FIG. 4, the thickness of the substrate 420 may be approximately 0.2 mm, the reflective sheet may be approximately 0.05 mm, the rigid light guide layer 430 may be approximately 0.3 mm, the first layer flexible light guide film may be approximately 0.2 mm, the second layer flexible light guide film 450 may be approximately 0.2 mm, and the key plate member 480 may be approximately 0.15 mm. However, considering gap of approximately 0.1 mm between the light guide layers 430-450, the overall thickness may be at least 1.6 mm. An additional third layer flexible light guide film may increase the thickness to at least 1.9 mm.

To maximize flexibility, the number of light sources 460 may be equal to the number of the light segments 401-403 multiplied by the number of light guide layers 430-450. In the embodiment shown in FIG. 4 there are three light segments 401-403 and in total, three layers of light guide layers 430-450. Therefore, there may be nine light sources 460 so that each of the light guide layers 430-450 may be illuminated independently. For example, by having nine light sources 460, the symbols or alphanumeric characters defined by the light extractors 471-479 may be illuminated independently, so that at any one particular time, only one of the symbols or alphanumeric characters will be displayed on the key plate member 480.

However, the symbol or alphanumeric characters defined by light extractors 470-479 on the exact same light guide layer 430-450 will be displayed concurrently. For example, the symbol defined by light extractor 470 has to be shown together with the symbol defined by the light extractor 471, because the two light extractors 470-471 are located on the same piece of light guide. The symbols or alphanumeric character may be displayed simultaneously by turning on all of the light sources 460. The different light sources 460 coupled to each layer may be configured to emit different colors of light. For example, by having a different color for the three light guide layers 430-450, the symbol or alphanumeric character defined by light extractors 471, 474, and 477 may be displayed with different colors.

In order to further control or regulate light transmission within the light guide layers 430-450, micro-optics may be formed at lower surface of each of the light guide layers 430-450. The micro-optics may be configured to direct light more in a predetermined direction. Due to the bending to form the alignment structures 435, light within the rigid light guide 430 in one light segment 401-403 may not leak to the neighboring light segments 401-403. Therefore, the crosstalk between different light segments 401-403 may be minimized.

Figure 4:
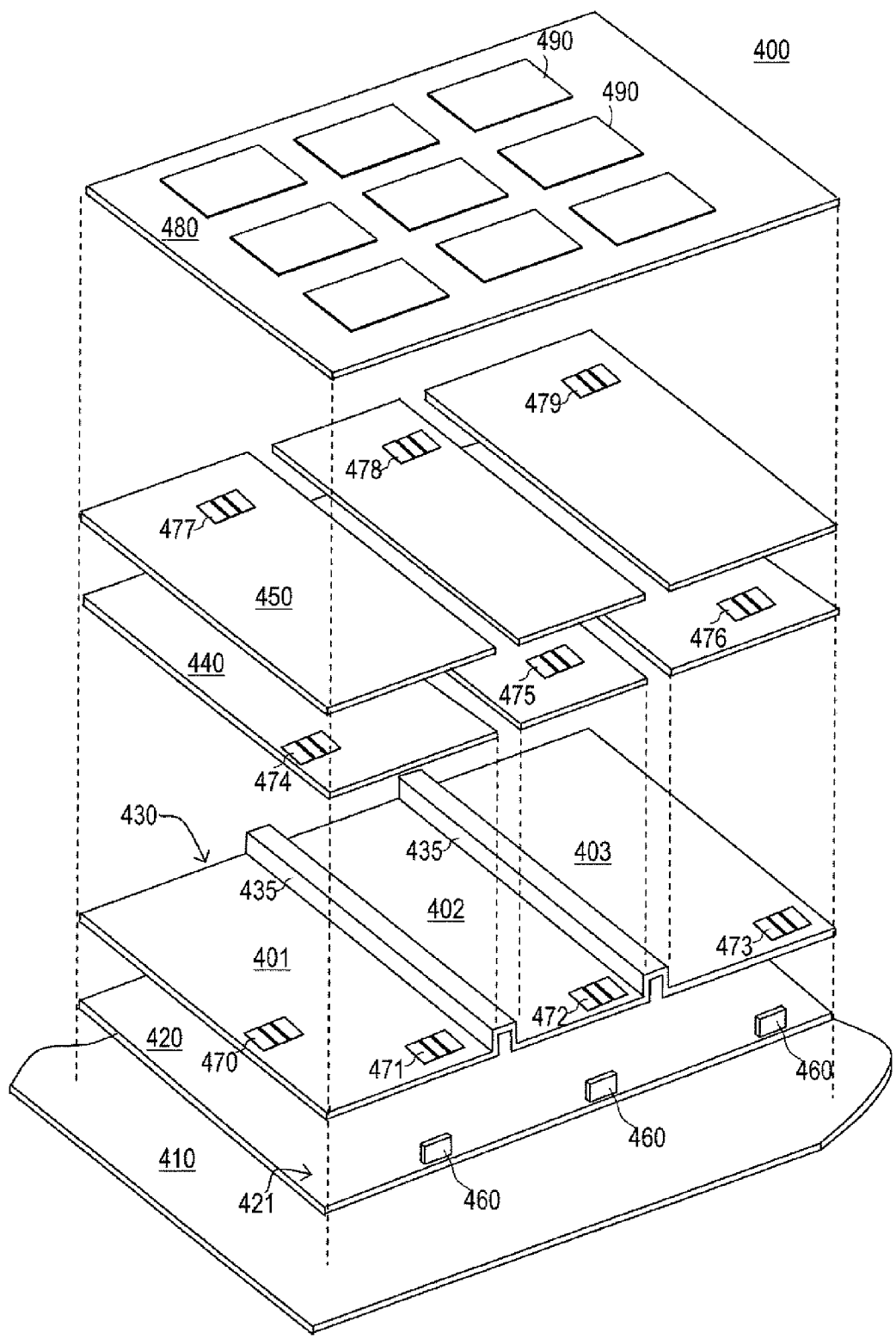
FIG. 4 illustrates an exploded, perspective view of a keypad assembly with a rigid light guide defining multiple light segments.
Figure 5A:
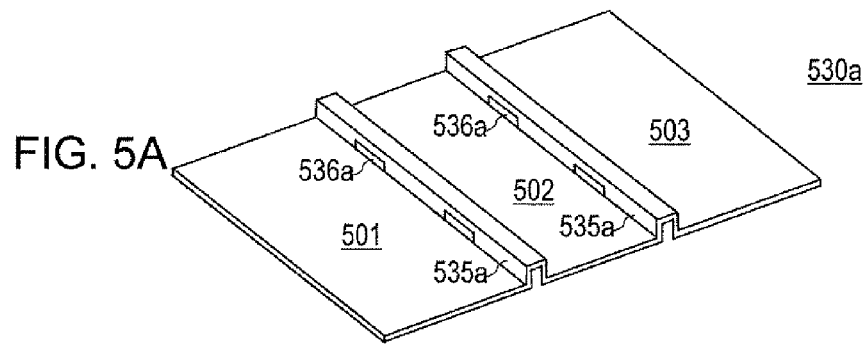
FIGS. 5A-5D illustrate several perspective views of various alternative rigid light guide designs.
Figure 5B:
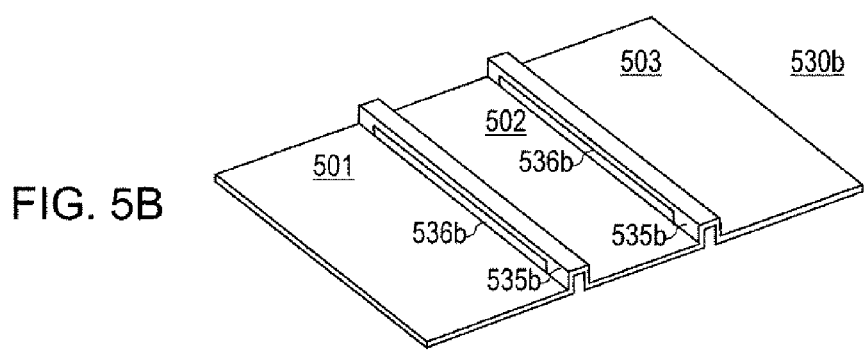
Figure 5C:
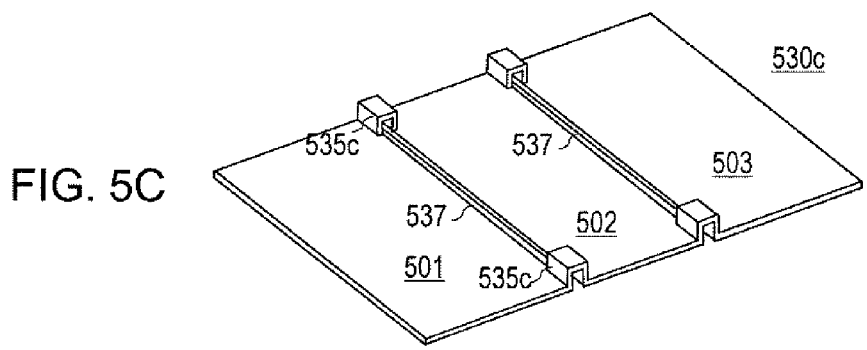

In order to maximize placement area for the light sources 460, the alignment structures 435 may be adapted to receive the light sources 460, as shown in FIGS. 5A-5C. FIGS. 5A-5D illustrate isometric views of various alternative embodiments for the rigid light guide layer shown in FIG. 4. Referring to FIGS. 4, and 5A-5B, the rigid light guide layers 530a and 530b may have the alignment structures 535a and 535b that may be adapted to accommodate the light sources 460 shown in FIG. 4. The light sources 460 may be located in the vicinity of the alignment structures 535a and 535b. The light sources 460 may be configured to illuminate light into any of the flexible light guide films 440-450 through the openings 536a and 536b. Referring to FIGS. 4 and 5C, the rigid light guide layer 530c shown in FIG. 5C may further define at least a trench 537. At the two ends of the trench 537 are the alignment structures 535c. The trench 537 may be large enough to accommodate the light source 460 therein. Another benefit of the trench 537 may be to ensure better optical separation between light segments 501-503.

Figure 5D:
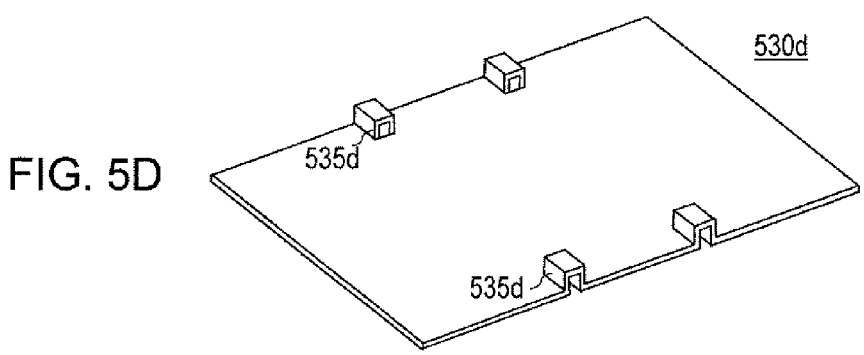

The rigid light guide layer 530d shown in FIG. 5D comprises alignment structures 535d along opposing sides of the rigid light guide layer 530d without any trenches 537, as shown in FIG. 5C. Unlike the rigid light guide layers 530a-530c shown in FIGS. 5A-5C where the light segments 501-503 defined by the alignment structures 535a-535c are optically separated, the entire rigid light guide layer 530d may be optically interconnected. The rigid light guide layer 530d may be useful for applications that require the entire input device to be illuminated together without each segment being illuminated independently, so that less light source 460 may be utilized. For rigid light guide layers 530a-530c, the multiple light segments 501-503 may be powered up or down simultaneously, as if the light segments 501-503 are optically interconnected, as shown FIG. 5D, by switching on and off the corresponding light sources dies 460 coupled to each light segments 501-503 simultaneously.

Figure 6A:
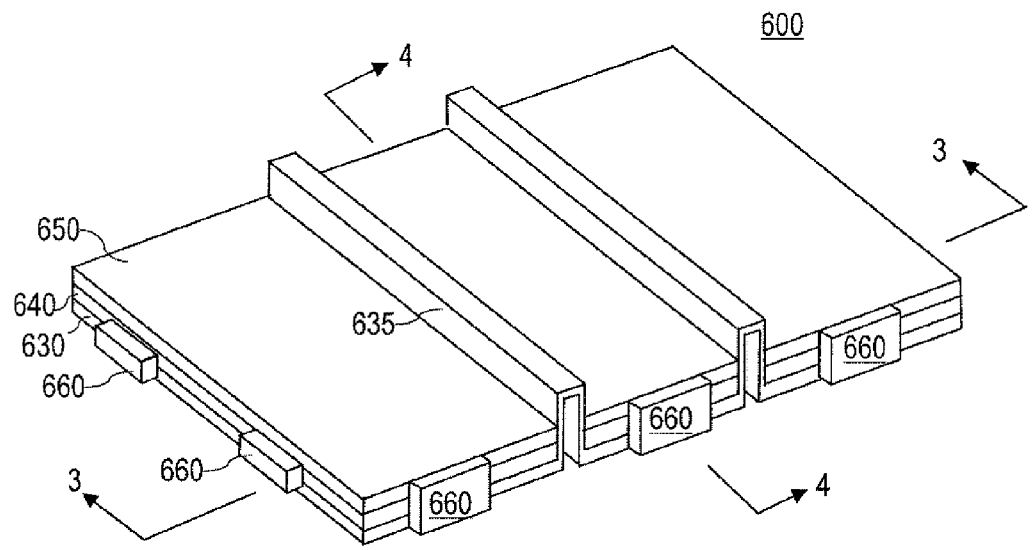
FIG. 6A illustrates an isometric view of a light guide assembly with a rigid light guide defining multiple light segments.
Figure 6B:
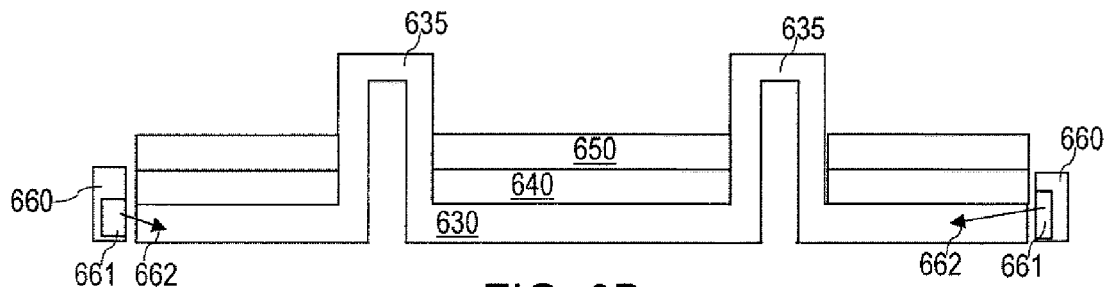
FIG. 6B illustrates a cross-sectional, side view of the light guide assembly taken along section line 3-3 of FIG. 6A.

FIG. 6A illustrates an isometric view of a light guide assembly 600 for the keypad assembly 400 shown in FIG. 4. The light guide assembly 600 may comprise a rigid light guide layer 630, a plurality of first layer flexible light guide films 640, a plurality of second layer flexible light guide films 650, and a plurality of light sources 660. The rigid light guide layers 630, the first layer flexible light guide films 640, and the second layer flexible light guide films 650 may be known collectively as light guide layers 630-650. Although the light guide layers 630-650 appear to be touching each other and connected, an air gap (not shown) may exist between the light guide layers 630-650. For example, there may be an air gap between the rigid light guide layer 630 and the first layer flexible light guide film 640. Another air gap may exist between the two flexible light guide films 640-650. This air gap phenomenon may also apply to subsequent embodiments and will not be explicitly discussed. A cross-sectional view of the light guide assembly 600 taken along line 3-3 is shown in FIG. 6B. Whereas a cross-sectional view of the light guide assembly 600 taken along line 4-4 is shown in FIG. 6C.

Figure 6C:
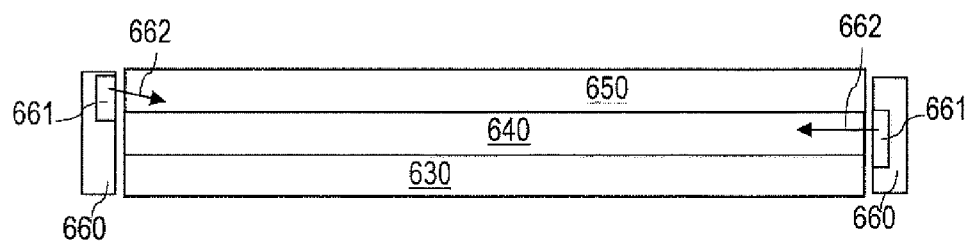
FIG. 6C illustrates a cross-sectional, side view the light guide assembly taken along section line 4-4 of FIG. 6A.
Figure 8:
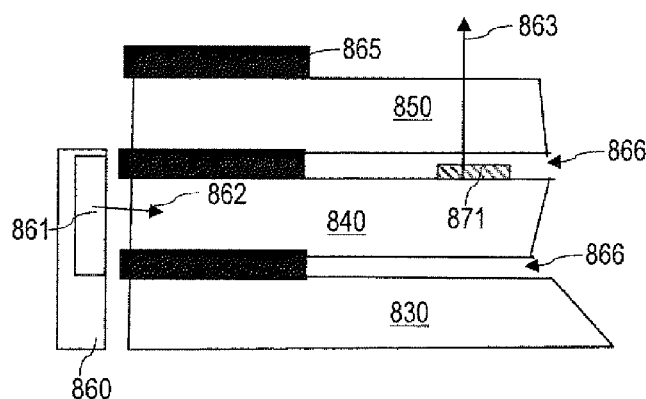
FIG. 8 illustrates how opaque sheets prevent crosstalk between light guide layers.

As shown in FIGS. 6B-6C, the light sources 660 may be configured to illuminate light into corresponding light guide layers 630-650. The light sources 660 may have a light window 661 positioned at different heights so that the light 662 emitted from the light source 660 may only enter substantially into predetermined light guide layers 630-650. The light windows 661 of most light sources 660 may be approximately 0.35 mm, whereas the minimum thickness of each of the light guide layers 630-650 may be 0.2 mm. While light source makers are working to reduce the window size 661 of the light source, emitted light 662 can be prevented from entering neighboring light guide layers 630-650 by attaching opaque sheets between the light guide layers 630-650, as shown in FIG. 8. As shown in FIG. 6B, the alignment structures 635 align each of the first layer flexible light guide films 640 and the second layer flexible light guide films 650 above each light segment 401-403 shown in FIG. 4.

Figure 7:
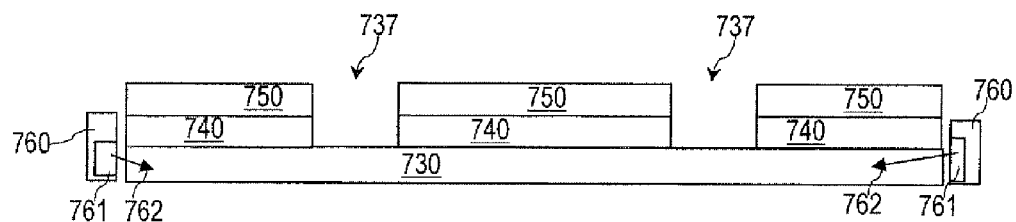
FIG. 7 illustrates a cross-sectional, side view of a light guide assembly using rigid light guide shown in FIG. 5D.

FIG. 7 illustrates a cross-sectional view of a light guide assembly similar to the cross-sectional view shown in FIG. 6B, but using a rigid light guide layer 530d shown in FIG. 5D. As shown in FIG. 7, the rigid light guide layer 730 may be optically connected from one end to the other end across the rigid light guide layer 730. Light 762 emitted from a light source 760 through light window 761 located at one end of the rigid light guide layer 730 may be transmitted to the other end of the rigid light guide layer 730. Although two light sources 760 are utilized in the embodiment shown in FIG. 7, one light source 760 might be adequate. The first layer flexible light guide film 740 and the second layer flexible light guide film 750 located above different light segments may be separated by trenches 737, and thus, optically independent.

FIG. 8 shows an enlarged cut-way, cross-sectional view near light source 860 to illustrate how opaque sheets 865 may be configured to prevent crosstalk between the light guide layers 830-850. As discussed earlier, the light windows 861 of the light source 860 may be larger than the thickness of each of the light guide layers 830-850. Opaque sheets 865 may be inserted at the periphery of each light guide layer 830-850 where the light sources 860 are located so that a gap 866 may be defined between each layer 830-850. The opaque sheets 865 may be any adhesive tape, usually black in color.

The thickness of the opaque sheets 865 may compensate the size of the light guide layers 830-850 to match the size of the light windows 861. As shown in FIG. 8, the thickness of the first layer flexible light guide film 840 together with the thickness of the opaque sheets 865 may be larger than the light window 861. The gap 866 defined by the opaque sheets 865 may be configured to prevent each light guide layer 830-850 from touching each other to prevent crosstalk. The light 862 emitted from the light source 860 may be transmitted substantially within the first layer flexible light guide film 840. A light extractor 871 may be configured to extract and direct light 863 towards the key plate member 480 (See FIG. 4). A majority of the light 863 extracted from the light extractor 871 enters into the neighboring light guide layers perpendicularly. In the embodiment shown in FIG. 8, the extracted light 863 may enter the second layer flexible light guide film 850 perpendicularly and passing through the second layer flexible light guide film 850.

Figure 9:
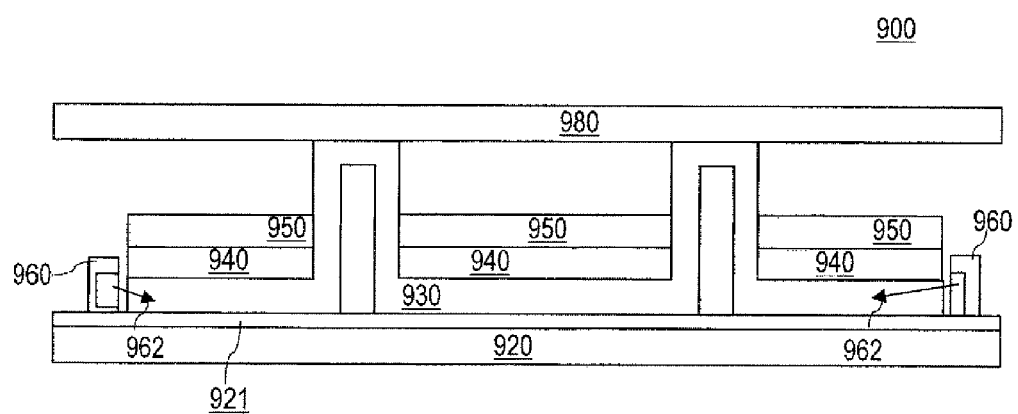
FIG. 9 illustrates a cross-sectional, side view of a keypad assembly having the light guide assembling shown in FIG. 6B.

FIG. 9 illustrates a cross-sectional view of a keypad assembly 900 similar to the cross-sectional view of the light guide assembly 600, shown in FIG. 6B. As shown in FIG. 9, the keypad assembly 900 comprises a substrate 920, a reflective sheet 921, a rigid light guide layer 930, a plurality of first layer flexible light guide films 940, a plurality of second layer flexible light guide films 950, a plurality of light sources 960, and a key plate member 980. The reflective sheet 921 may be configured to reflect light 962 emitted from the light source 960 toward the rigid light guide layer 930. There may be an air gap (not shown) between the rigid light guide layer 930 and the first layer flexible light guide film 940, and another gap (not shown) between the two flexible light guide films 940-950.

Although the embodiments in FIGS. 1-9 are regarding keypads or input devices, the embodiments may be applicable as display apparatuses for any electronic devices without an LCD screen. For example, the embodiments illustrated in FIGS. 1-9 may be adapted to be used in educational electronic toys with a limited screen menu selection. In order to keep costs down, the educational toy may not have an LCD screen, but rather may rely on the light guide assembly as a display. In that case, the key plate member 980 shown in FIG. 9 may be replaced by a top plate member that may not have any capability to accommodate capacitive sensing or pressing.

Figure 10:
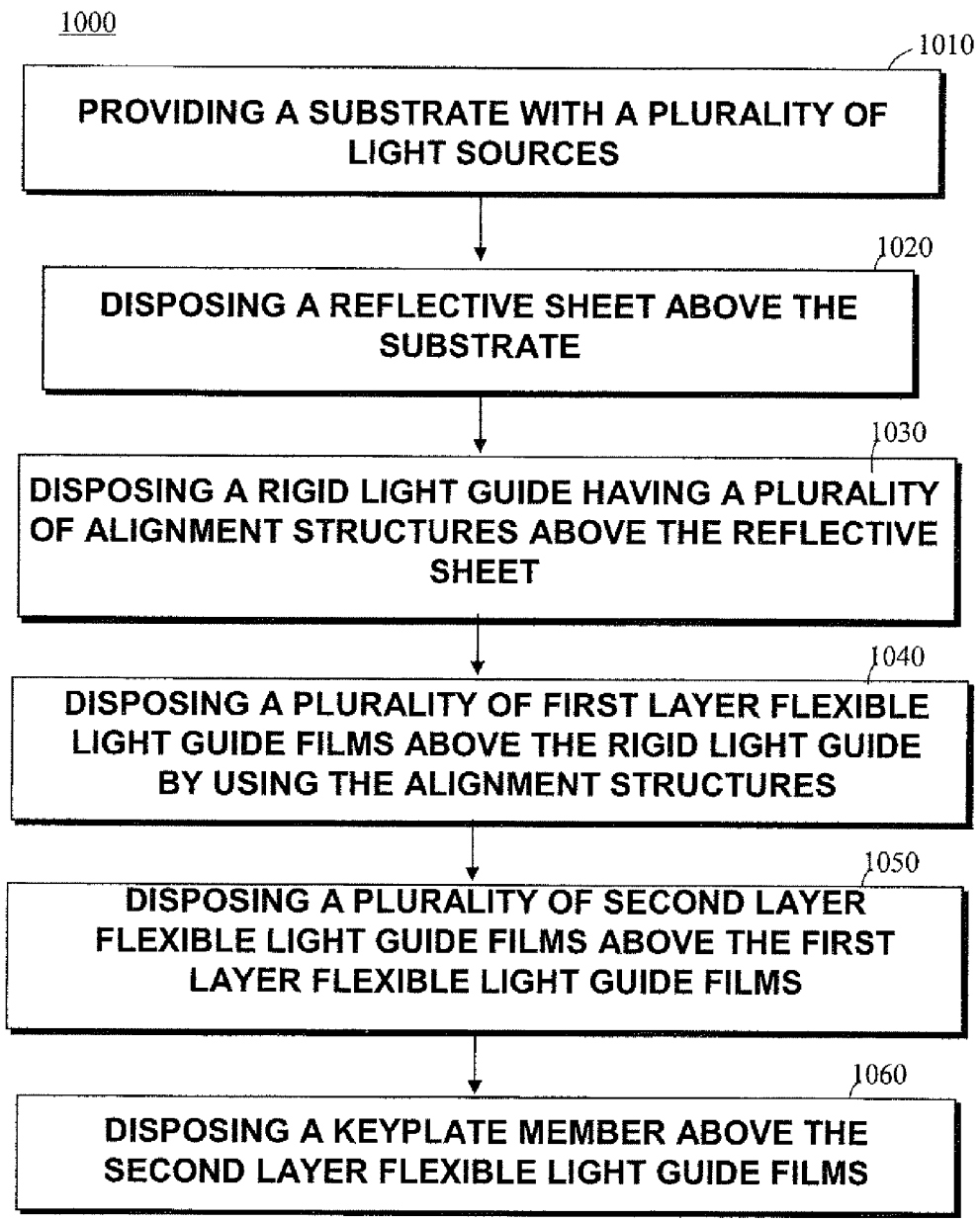
FIG. 10 illustrates flow chart for a method of assembling the light guide shown in FIG. 4.

FIG. 10 illustrates a flow chart of a method for assembling the keypad assembly 400 shown in FIG. 4. The method 1000 may start with step 1010 where a substrate having a plurality of light sources is provided. The method next proceeds to step 1020 in which a reflective sheet may be disposed above the substrate. In step 1030, a rigid light guide layer may be disposed above the reflective sheet. The rigid light guide layer may have a plurality of alignment structures to accommodate and align the subsequent flexible light guide films. The alignment structures of the rigid light guide layer may further define the rigid light guide layer into multiple light segments. In step 1040, a plurality of first layer flexible light guide films may be disposed on the rigid light guide layer, with at least one first layer flexible light guide film on each of the light segments. The method then proceeds to step 1050 where step 1040 is repeated with the plurality of second layer flexible light guide films. Finally, in step 1060, a key plate member may be disposed above the second layer flexible light guide films.

For keypad assemblies having more than two layers of flexible light guide films, step 1050 may be repeated to dispose a third layer flexible light guide film on the second layer light guide films. For applications where the device is not an input device, the method 1000 may be adapted by replacing the key plate member in step 1060 with a top plate member configured to display relevant information characterized by the symbol or alphanumeric characters defined by the light extractors.

Although specific embodiments of the invention have been described and illustrated herein above, the invention is not to be limited to the specific forms or arrangements of parts so described and illustrated. For example, the light windows illustrated in FIGS. 6B-6C may not be larger than the thickness of the first layer flexible light guide films and the second layer flexible light guide films. The light source described above may be LED dies or some other future light source die as known or later developed without departing from the spirit of the invention. The scope of the invention is to be defined by the claims appended hereto and their equivalents.

What is claimed is:

1. A light guide for use in an input device, the light guide comprising:
    a substrate;
    a reflective sheet disposed on the substrate;
    a rigid light guide layer disposed on the reflective sheet, the rigid light guide layer comprising a plurality of alignment structures defining the rigid light guide layer into multiple light segments;
    a plurality of first layer flexible light guide films disposed correspondingly above each light segment of the rigid light guide layer;
    a plurality of second layer flexible light guide films disposed correspondingly above each of the first layer flexible light guide films; and
    a plurality of light sources, each of the plurality of light sources configured to emit light into one of the rigid light guide layer, the first layer flexible light guide films and the second layer flexible light guide films,
    wherein the first layer flexible light guide films and the second layer flexible light guide films are aligned into corresponding positions by the plurality of alignment structures of the rigid light guide layer.

2. The light guide of claim 1, wherein the rigid light guide layer is formed using an injection molding process.

3. The light guide of claim 1, wherein the rigid light guide layer, the first layer flexible light guide films, and the second layer flexible light guide films each comprise at least one light extractor, respectively.

4. The light guide of claim 3, wherein the at least one light extractor defines a symbol or an alphanumerical character configured to be displayed on an outer surface of the input device.

5. The light guide of claim 1, wherein the rigid light guide layer, the first layer flexible light guide films and the second layer flexible light guide films comprise micro-optics for directing light emitted from at least one of the plurality of light sources.

6. The light guide of claim 1, wherein the multiple light segments within the rigid light guide layer are optically interconnected.

7. The light guide film of claim 1, wherein the plurality of alignment structures are ribs extending from one edge of the rigid light guide layer to an opposing edge of the rigid light guide layer.

8. The light guide of claim 1, wherein the plurality of alignment structures are configured to accommodate at least one of the plurality of light sources, wherein the at least one of the plurality of light sources is located in close proximity of the plurality of alignment structures.

9. The light guide of claim 1, wherein the rigid light guide layer, the first layer flexible light guide films and the second layer flexible light guide films are separated by opaque separation sheets.

10. The light guide of claim 9, wherein the opaque separation sheets are configured to prevent crosstalk between the rigid light guide layer, the first layer flexible light guide films, and the second layer flexible light guide films.

11. The light guide of claim 1 further comprising a third layer flexible light guide films located correspondingly above at least one of the first layer flexible light guide films and the second layer flexible light guide films.

12. An input device, comprising:
    a substrate;
    a reflective sheet disposed on the substrate;
    a rigid light guide layer disposed on the reflective sheet, the rigid light guide layer further comprising a plurality of alignment structures;
    a plurality of light segments defined by the plurality of alignment structures;
    a plurality of first layer flexible light guide films disposed above each of the plurality of light segments, respectively;
    a plurality of second layer flexible light guide films disposed above each of the first layer flexible light guide films, respectively;
    a key plate member disposed on the second layer flexible light guide films configured for a user of the input device to press on; and
    a plurality of light sources, each of the plurality of light sources configured to emit light into one of the rigid light guide layer, the first layer flexible light guide films and the second layer flexible light guide films,
    wherein the first layer flexible light guide films and second layer flexible light guide films are aligned into corresponding positions by the plurality of alignment structures of the rigid light guide layer.

13. The input device of claim 12, wherein each of the rigid light guide layer, the first layer flexible light guide films and the second layer flexible light guide films comprise at least one light extractor, respectively.

14. The input device of claim 13, wherein the at least one light extractor defines a symbol or an alphanumerical character.

15. The input device of claim 12, wherein the plurality of light segments within the rigid light guide layer are optically interconnected.

16. The input device of claim 12, wherein each of the plurality of alignment structures is configured to accommodate at least one of the plurality of the light sources such that each of the plurality of light sources is located within close proximity of each of the plurality of alignment structures.

17. The input device of claim 12, wherein the rigid light guide layer, the first layer flexible light guide films and the second layer flexible light guide films are separated by opaque separation sheets.

18. The input device of claim 17, wherein the opaque separation sheets are configured to prevent crosstalk between the rigid light guide layer, the first layer flexible light guide films and the second layer flexible light guide films.

19. The input device of claim 12, further comprising a third layer flexible light guide film located between the key plate member and one of the second layer flexible light guide films.

20. An light guide assembly for an electronic device, comprising:
    a substrate;
    a reflective sheet disposed above the substrate;
    a rigid light guide disposed above the reflective sheet;
    a plurality of alignment structures located at the rigid light guide;
    a plurality of light segments within the rigid light guide defined by the alignment structures;
    two layers of flexible light guide films disposed above each light segment, wherein the flexible light guide films are configured to connect optically to the corresponding light segment;
a top plate member disposed above the two layers of flexible light guide films of each light segment;
a plurality of light sources located on a periphery edge of the substrate, each of the plurality of light sources configured to emit light into one of the rigid light guide and any periphery edge of either of the two layers of flexible light guide films.

* * * * *